United States Patent [19]

Sampson

[11] 4,289,619
[45] Sep. 15, 1981

[54] MATERIAL HANDLING APPARATUS

[76] Inventor: Milo J. Sampson, 1713 Douglas, Ames, Iowa 50010

[21] Appl. No.: 177,199

[22] Filed: Aug. 11, 1980

[51] Int. Cl.³ ............................................. B01D 35/16
[52] U.S. Cl. ................................................. 210/159
[58] Field of Search ........................ 210/153, 158, 159

[56] References Cited

U.S. PATENT DOCUMENTS

| | | | |
|---|---|---|---|
| 2,128,345 | 8/1938 | Briggs | 210/159 |
| 2,335,573 | 11/1943 | Scott | 210/159 |
| 2,904,181 | 9/1959 | Baker et al. | 210/159 |
| 2,963,156 | 12/1960 | Nordell | 210/159 |
| 3,358,837 | 12/1967 | Tillett et al. | 210/159 |
| 3,482,698 | 12/1969 | Ostnas | 210/159 |
| 3,591,006 | 7/1971 | Daferner | 210/159 |
| 4,138,334 | 2/1979 | Rimmele | 210/159 |
| 4,184,957 | 1/1980 | Botsch | 210/159 |
| 4,214,989 | 7/1980 | Rudolph et al. | 210/159 |
| 4,218,319 | 8/1970 | Hansson | 210/159 |

FOREIGN PATENT DOCUMENTS 2718420  2/1978  Fed. Rep. of Germany ...... 210/159

*Primary Examiner*—Theodore A. Granger
*Attorney, Agent, or Firm*—Morton S. Adler

[57] ABSTRACT

With a screen disposed in a flowing waterstream of sewage and other waste materials to intercept objects such as rags, plastic, wood, metal, fragments of masonry and the like, such objects are removed from the screen by a reciprocating mechanical rake to a point of disposal or further treatment. Elongated rods secured at one end to the rake are pivotally connected at the other end to a power driven endless chain for travel therewith towards and away from the screen with such chain and power supply being remotely located at a point free of contact with the waterstream. The screen shown with this invention is one formed of parallel spaced longitudinal bar grates and teeth on the rake extend between the grates as the rake travels on a lower track during its debris removal stroke effected by the rod connection to the chain and the moving chain draws the rods into engagement with a fulcrum at the end of the cleaning stroke for tilting the rod and rake upwardly for registration of the rake with an upper track so that the continuing travel of the chain in reversing its direction moves the rake through the rod connection on the upper track in a return stroke out of engagement with the screen to a point where the rake drops by gravity onto the lower track in engagement with the screen for another debris removal stroke. Debris adhering to the rake at the end of the cleaning stroke will fall therefrom by gravity as the rake is tilted in transfer from the lower track to the upper track.

11 Claims, 5 Drawing Figures

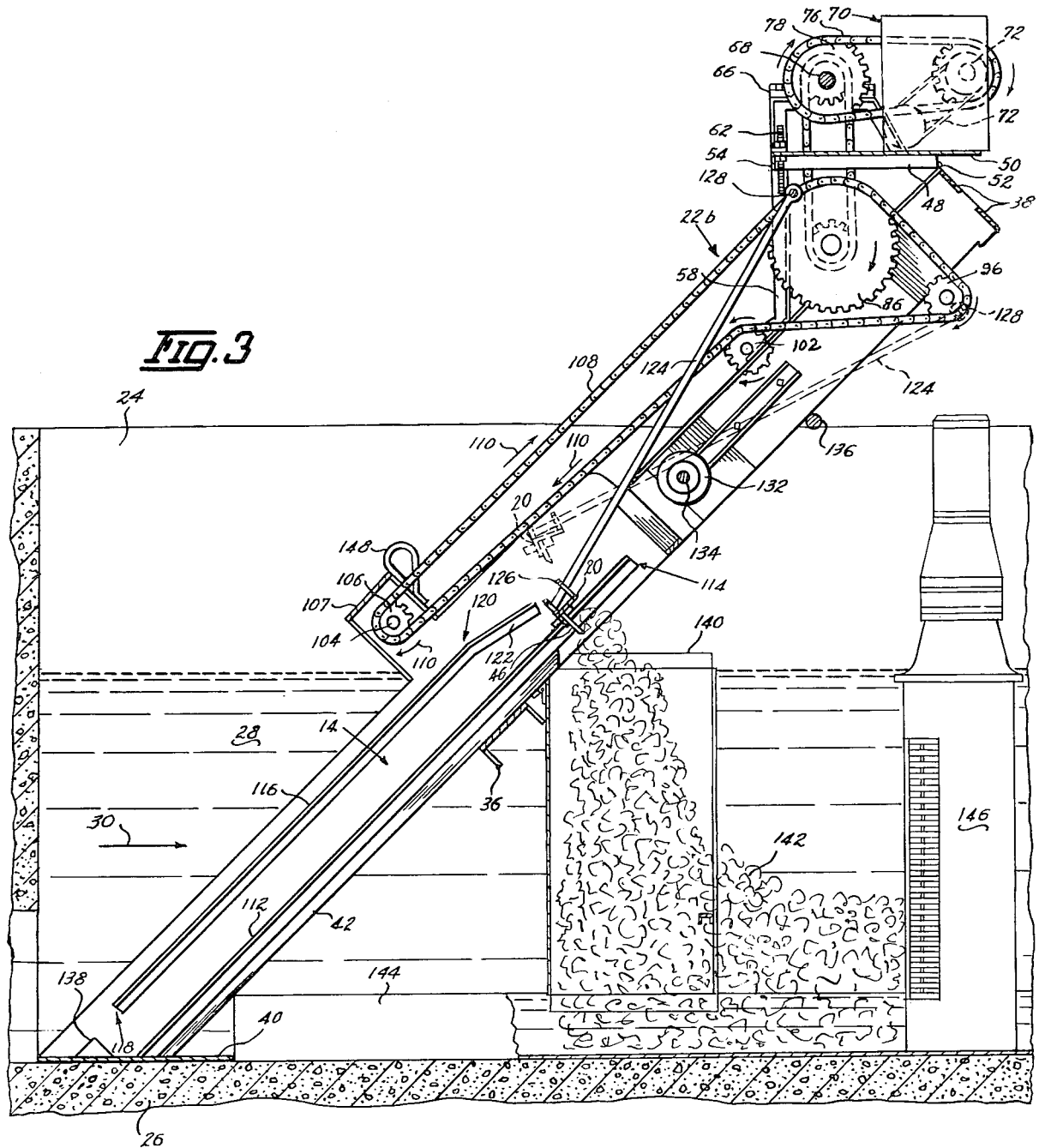

MATERIAL HANDLING APPARATUS

BACKGROUND OF THE INVENTION

This invention relates to improvements in a rake for removing refuse and debris accumulated against a screen disposed in a flowing waterstream of sewage, industrial waste and the like on its way to a treatment plant.

The handling and treatment of sewage and other waste materials is a continuing problem wherever population centers exist in order to meet the objectives of safe sanitary requirements. Sewer flows abound with an infinite variety of extraneous objects such as logs, sticks, rags, plastic items, rubber, stone, metal and the like which must be removed or reduced in size before the sewer waterstream reaches the treatment facilities and well known devices for such purposes include bar racks or screens, coarse screens and rotary disc and drum screens to intercept material together with comminutors that reduce materials to small dimensions.

Typically, the removal device is in the line of flow to intercept the debris and such removal devices usually have various mechanical rake means for collecting the debris accumulations since manual removable by grab hooks and the like is generally unsatisfactory. The collected debris in some systems is passed through a comminutor for return to the waterstream and in other systems, it is buried or otherwise disposed of with sanitary engineers having opinions both pro and con as to the advantages and disadvantages of each system.

The present invention is concerned with improvements for the operation of the mechanical rake relative to a screen device of the type indicated and for the purpose of illustrating this invention, I have preferably shown it on the well known bar screen type of debris removal device which is formed by a plurality of spaced parallel longitudinal bar grates disposed on an inclined plane in a flowing stream of sewage and it will be understood that such invention may also be used with other screening devices having mechanical rakes. This invention, as will appear, is also shown for illustration in use in combination with a communitor for grinding the collected debris and returning it to the waterstream but such comminutor forms no part of this invention and is not required as a part thereof as the accumulations on the screen can be delivered to any desired point for disposition or treatment other than as illustrated herein.

In the use of a bar screen as noted above, the accompanying mechanical rake, to be effective, must operate in the cycle of an operational debris engaging stroke and a non-debris engaging return stroke and various devices for such purposes are exemplified in U.S. Pat. nos. 2,128,345, 2,904,181, 3,358,837 and 4,138,334 where the mechanisms shown appear to be sophisticated in nature and where the location of parts extending over a relatively wide area between distant ends of the overall cleaning structure and sometimes into the waterstream increases the difficulty of accessibility to the various working parts for servicing and maintenance.

Accordingly, in view of the above observations and as a result of many years of experience in the operation of sewage disposal systems, it is one of the important objects of this invention to provide improved operating means for a rake on a bar screen in a sewage system that is simple in construction, highly effective and efficient in operation, economical to manufacture and designed to operate with a minimum of servicing and maintenance over long periods of time without breakdown or stoppage.

Another object herein is to provide a rake of the above class wherein the operation and non-operational strokes are effected by an endless chain drive assembly for which all components thereof are compactly arranged at a point remote from the debris intercepting end of the bar screen structure so that said assembly is free of contact with the waterstream and conveniently accessible for servicing and maintenance.

A further object herein is to provide a rake as characterized that operates at the debris intercepting end of the screen structure by connection through elongated rod members to a remotely disposed chain drive assembly that moves the rake in its cleaning stroke on a lower track in engagement with the screen and at the end of such stroke, elevates the rake into registration with an upper track and moves it thereon out of engagement with the screen in a return stroke to a point where the rake drops by gravity to the lower track in position for another cleaning stroke.

Still another object is to provide a bar screen rake movable by a chain drive assembly as characterized where, in the movement of the rake from its cleaning stroke to its return stroke, it is tilted by such assembly to a degree permitting any accumulations thereon to fall by gravity for a self-cleaning capability.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 3 is a view similar to FIG. 2 but showing the rake connection to the chain drive assembly in solid lines at the end of the cleaning stroke on the lower track and in broken lines at the beginning of the return stroke on the upper track, FIG. 5 is a fragmentary perspective view showing a second embodiment of the bar screen component.

DESCRIPTION OF THE PREFERRED EMBODIMENTS

Figure 1:
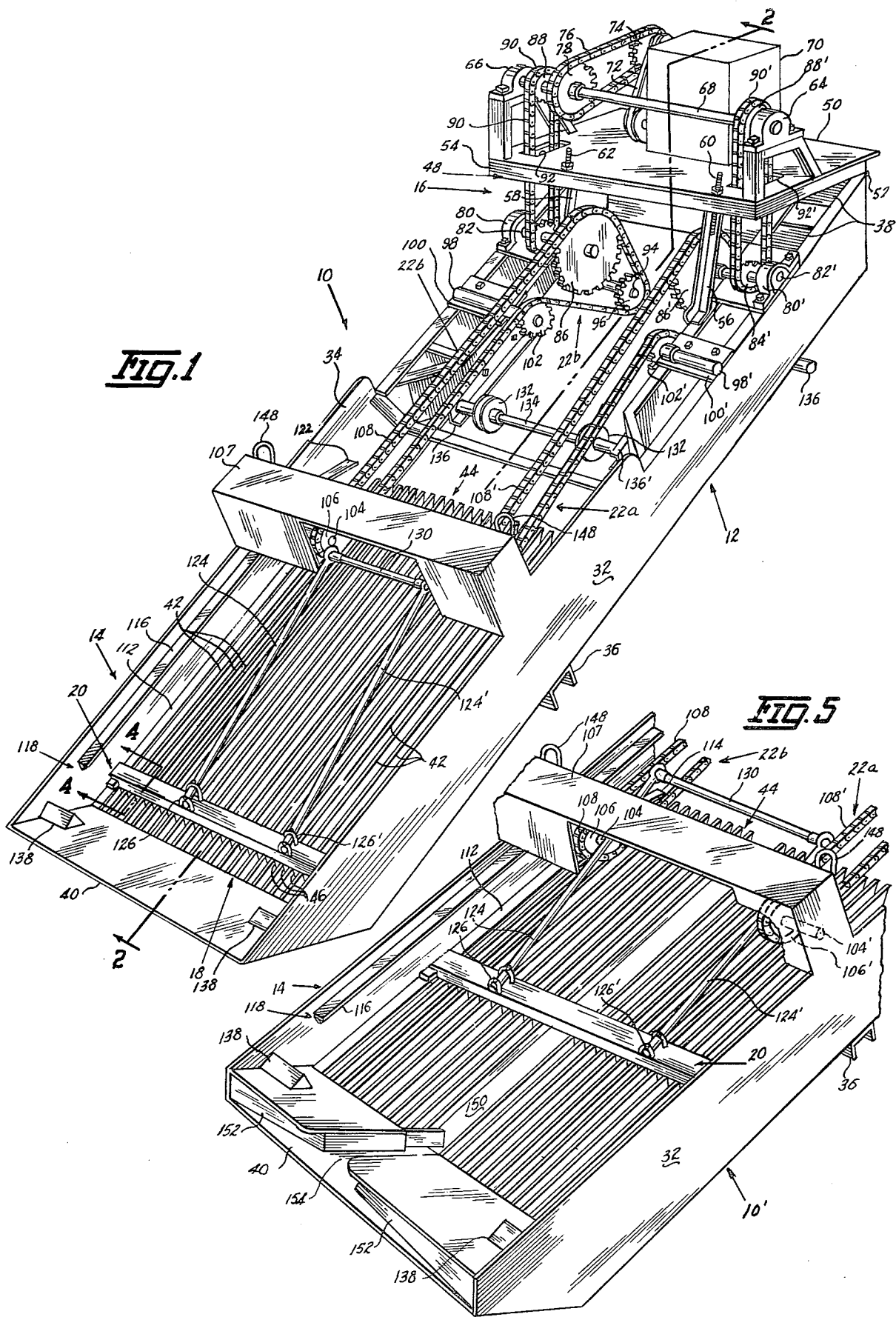
FIG. 1 is a perspective view of a rake and chain drive assembly therefor for a bar screen construction according to the present invention.

Referring to the drawings, this bar screen construction is designated by the numeral 10 as best seen in FIG. 1 and comprises in general, an elongated frame 12 defining a lower end 14 and an upper end 16 and a bar screen 18 on the lower end 14 over which a mechanical rake 20 is reciprocated by a power driven chain drive assembly 22 at the upper end 16, all of which will be described in more detail as this description proceeds.

Device 10, in an usual and well known manner in sewage systems, is disposed in a refuse laden waterstream flowing through a sewage sluiceway formed by sidewalls 24 and a bottom floor 26, usually of concrete, in which the direction of flow of the waterstream 28 is indicated by the arrow 30, it being understood that screen 18 is obliquely disposed to flow 30 for intercepting extraneous solid materials.

Figure 2:
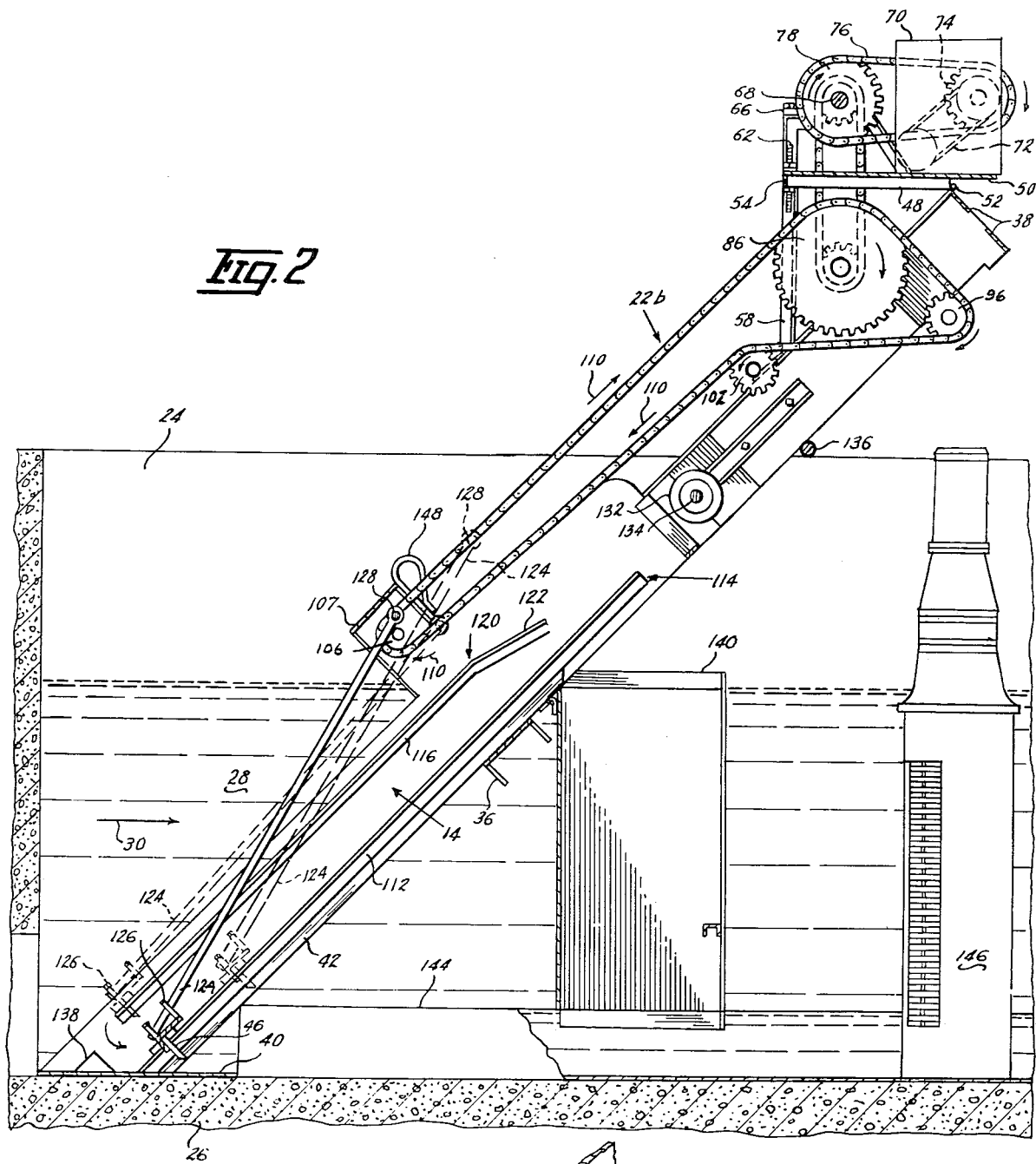
FIG. 2 is a cross sectional view taken on the line 2—2 of FIG. 1 and further showing this bar screen construction in operable position in a sewage sluiceway for purposes of illustration together with solid and broken line showings of the rake and rod connections to the chain drive assembly relative to different positions of the rake on the upper and lower tracks and on the bar screen at the end of the return stroke and the beginning of the cleaning stroke.
Figure 4:
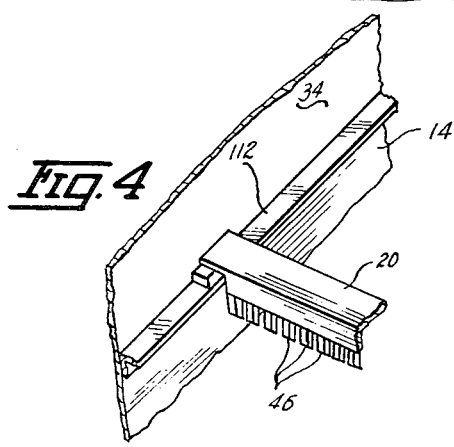
FIG. 4 is a cross sectional view taken on the line 4—4 of FIG. 1.

Referring now more particularly to FIGS. 1-3, frame 12 comprises elongated side plates or beams 32, 34 secured in parallel spaced relationship by suitable cross braces such as 36 at the central underside and 38 at the upper or rear end 16. A bottom plate 40 connecting sides 32, 34 at end 14 is angularly disposed to the longitudinal axis of said sides to suitably rest on the horizontal sluiceway floor 26 to provide the inclined position of device 10 as shown.

The bar screen 18 includes a plurality of elongated spaced parallel bar grates 42 extending from plate 40 to approximately a midpoint 44 towards the upper end 16 of frame 12. Rake 20 is disposed transversely of screen 18 for reciprocal movement longitudinally thereof and has depending comb-like teeth 46 to extend into the spacing between grates 42 on its upward cleaning stroke on screen 18 and such screen and rake as thus far described are well known and commonly used expedients in sewer treatment systems for which no invention, per se, is being claimed but to which I have combined new and improved means for the operation and use thereof as I will now describe.

At the upper end 16 of frame 12 (FIG. 1), I have mounted a platform 48 angularly disposed to the inclined longitudinal axis of frame beams 32, 34 so as to be on a horizontal plane when device 10 is in its operational position as shown. Preferably, the rear end 50 of platform 48 is pivotally attached to beams 32, 34 as by a hinge pin means 52 and the forward end 54 of such platform is adjustably secured to upstanding spaced braces 56, 58 by the respective threaded fasteners 60, 62 by which the level of platform 48 can, when necessary, be adjusted to a limited degree for taking slack out of certain chain drives as will later be referred to in more detail.

Oppositely disposed on platform 48 are the trunnions 64, 66 in which shaft 68 is journalled for rotation about its longitudinal axis as best seen in FIG. 1. Any suitable drive means may be employed to rotate shaft 68 and for such purpose, I have used a commercially available motor means 70 mounted on platform 48 which is connected in a well known manner by a belt drive means 72 arranged to rotate a small sprocket wheel 74 that is connected by the endless chain 76 to the larger sprocket wheel 78 mounted on shaft 68. The chain drive assembly 22, as will appear, is operated by shaft 68 and, preferably, I have used two like chain drive trains for which one designated 22a is generally adjacent and parallel to beam 32 and the other designated 22b is generally adjacent and parallel to beam 34 as best seen in FIG. 1 so that a description of one such train, as for example train 22b, will suffice and like numbers primed will be given to like parts in train 22a. Further, in parts described for train 22b as being mounted relative to beam 34 and trunnion 66, it will be understood that correspondingly numbered parts primed for train 22a are mounted relative to beam 32 and trunnion 64.

In vertical alignment below trunnion 66, a trunnion 80 is mounted to beam 34 and carries the inwardly extending stub shaft 82 on which there is mounted the small sprocket wheel 84 and the larger sprocket wheel 86 in spaced relationship thereto. On shaft 68 intermediate trunnion 66 and wheel 78 is a sprocket wheel 88 corresponding to wheel 84 on shaft 82 and in vertical alignment therewith with wheels 84, 88 engaged by the endless chain 90 extending through slot 92 in platform 48. The adjustment of platform 48 by means of bolts 62 referred to above is to tighten or loosen chains 90, 90', if necessary.

Below shaft 82 and parallel thereto but offset slightly towards frame end 16 is the stub shaft 94 mounted on beam 34 in any suitable manner and carrying the small sprocket wheel 96 aligned with the larger wheel 86. Forwardly of shaft 82 towards frame end 14 is stub shaft 98 mounted to beam 34 as by plate 100 in a general parallel planar relationship to shaft 82 and which carries the idler sprocket wheel 102 aligned with wheels 86, 96. Forwardly of shaft 98 is another like shaft 104 with sprocket wheel 106 (FIG. 3) suitably mounted on beam 34 in housing 107 at a point near but spaced forwardly from the rear extremity 44 of the bar screen 18 as best seen in FIG. 1 and the endless chain 108 engages wheels 86, 96, 102 and 106 for movement in the direction indicated by arrows 110 seen in FIGS. 2, 3. Thus far described, it will be appreciated that chain trains 22a, 22b are relatively simple in construction and are compactly arranged at frame end portion 16 which is remote from the waterstream 28 so as not to be affected thereby and are easily accessible for any servicing or maintenance. The connection of rake 20 to the chain drive means is described as follows.

Rake 20 extends to and between beams 32, 34 (FIG. 1) where the respective ends of the rake are provided with friction reducing pads of any suitable material such as Teflon or the like that ride during the upwardly or cleaning stroke on a respective lower planar track 112 longitudinally secured to the inner side of the respective beams 32, 34 and extending from the bottom plate 40 to point 114 (FIGS. 2,3) slightly beyond the rear end 44 of the bar screen 18. An upper track 116 on each respective beam 32, 34 for the return stroke as will appear, is in vertically spaced parallel relationship to track 112 between its lower or forward end 118 to point 120 near its rearward or upper end where it is inclined as at 122 towards but not to track 112 to terminate approximately parallel to end 44 of the bar screen 18.

A pair of elongated spaced parallel rods 124, 124' are secured at corresponding ends to rake 20 as at 126, 126'. The other end of rod 124 is attached to chain 108 of train 22b for travel therewith by a regular chain pin 128 about which it can pivot and rod 124' is similarly attached to chain 108' on train 22a. The ends of rods 124, 124' connected to the respective trains 22b, 22a are preferably connected by a suitable self-aligning cross bar 130. Spaced fulcrum wheels 132, 132' for engagement respectively as will appear by rods 124, 124' are mounted to shaft 134 suitably secured at respective ends to beams 32, 34 intermediate wheels 102, 102' and end 44 of the bar screen 18 with shaft 134 as seen in FIGS. 2,3 being approximately midway between the planes of the vertically spaced lower and upper tracks 112, 116.

The operating position of device 10 in a sluiceway is illustrated in FIGS. 2,3 where the bottom plate 40 rests on the sluiceway floor 26 and the upper portion of the inclined beams 32, 34 are provided on their bottom edge with the transverse rod support 136 projecting perpendicularly from each bean to rest on the top edge of the sluiceway walls 24. Also, as is usual in such installations, the width of device 10 corresponds to the width of the sluiceway. Stop members 138 are on the bottom plate 40 adjacent the respective beams 32, 34 in line with the lower ends of the respective tracks 112, 116 for reasons that will be later explained. Lifting hooks 148 are secured to beams 32, 34 near housing 107 by which device 10 can be easily and quickly lowered into or removed from the sluiceway by any suitable lifting means.

OPERATION

With reference more particularly to FIGS. 2,3, it will be understood that the waterstream 28 moving in the direction of the arrow 30 flows against the bar screen 18 where large pieces of debris and refuse incapable of passing through the screen are collected and moved by rake 20 upwardly on the screen and off of end 44 to rejoin the flow that does negotiate the screen for direction, according to the system used, to a point of disposal or for further treatment. While the disposal or further treatment of the accumulated debris is not a part of the present invention, I have shown for purposes of illustration a system employing the further treatment method which includes an inclined chute 140 at the underside of beams 32, 34 at point 44 to receive debris 142 falling off of the screen 18 and with such chute 140 adapted to deliver material by gravity to a longitudinal trough 144 on the sluiceway floor 26 by which flow through the screen 18 and material from chute 140 is delivered to a comminutor or grinder 146 through which it passes on the way to other treatment facilities (not shown) all in a well known manner. The present invention is directed to improved means for reciprocating rake 20 relative to screen 18 and this is accomplished as follows.

The chain trains 22a, 22b of the chain drive assembly 22 are, in effect, duplicates and complementary to each other as described so that reference will be had only to train 22b and the connection of rod 124 thereto and to rake 20 with the understanding that such description applies equally to the connection of rod 124' to rake 20 and to train 22a.

Train 22b moves in the direction of arrows 110 by operation of motor 70 through the chain drive members 78, 90 in a well known manner. In such movement, train 22b moving towards end 16 of frame 12 away from screen 18 passes over the top of the large sprocket wheel 86 to continue rearwardly and downwardly around the smaller sprocket wheel 96 and thence upwardly and forwardly towards screen 18 over the idler wheel 102 and thence forwardly under and around sprocket wheel 106 for return to wheel 86. In this arrangement, train 22b has the vertically spaced parallel chain portions defined by the lower portion between wheels 102, 106 and the upper portion from wheel 106 towards wheel 102 and continuing to wheel 86 with the parallel portions being on a higher plane than the upper track 116 and the fulcrum wheels 132. Rod 124 by attachment to chain 108 in train 22b, travels with chain 108 throughout the path described to pull rake 20 upwardly and rearwardly on screen 18 in one direction for the cleaning stroke and in the other direction, to push it forwardly and downwardly for the return stroke.

Rake 20 on its upward cleaning stroke rides on the lower track 112 and the beginning of such stroke is seen in the solid line position of rod 124 in FIG. 2 shown attached to the rake 20 at its lower end and to chain 108 at its upper end in which position the upper end of rod 124 is negotiating the forwardmost wheel 106. It will be understood that here rake 20 will be moving collected debris on screen 18 and the upstroke travel of rake 20 is shown in broken lines to the right of the solid line position in FIG. 2.

When the end of rod 124 reaches the top of the large sprocket wheel 86 seen in solid lines in FIG. 3, rake 20, still on the lower track 112, will have reached the end of the cleaning stroke and have cleared the end 44 of screen 18 so that debris 142 falls onto chute 140 and thence into trough 144. In this position, rod 124 is inclined upwardly from track 112 to extend over and in alignment with the fulcrum wheel 132 whereby as rod 124 at pin 128 travels with chain 108 downwardly to wheel 96, it is brought into engagement intermediate its ends with the fulcrum wheel 132 and as the end of rod 124 negotiates wheel 96, such rod is tilted as seen in broken lines in FIG. 3 to elevate rake 20 to a plane above the inclined end 122 of the upper track 116. Chain 108, once around wheel 96, begins a forward and upward direction of travel towards screen 18 over the idler wheel 102 to thus move rod 124 forwardly over the fulcrum wheel 132 and place rake 20 in a position for engaging the upper track 116 as chain 108 continues to move towards wheel 106 and to move rake 20 on the upper track 116 in a return stroke out of engagement with debris accumulating on screen 18. Also, during the movement of rake 20 from the lower track 112 to the upper track 116, it becomes tilted to a degree that debris accumulation thereon will fall off onto chute 140.

As rake 20 completes its return stroke represented in broken lines at the left of its solid line position in FIG. 2, it will clear the free lower end 118 of track 116 and drop by gravity to a sliding contact with stop 138 and onto the lower track 112 for the next cleaning stroke.

With reference now to FIG. 5, I have shown a modification designated 10' of the lower end of device 10 in which a selected number of grates 42 is removed from the central section of screen 18 to form the wider screen opening 150 that communicates with trough 144. Also, converging walls 152 are placed on plate 40 as shown to form a channel 154 to opening 150 and this arrangement can be used to advantage with relatively low volume waterstream flows whereby opening 150 permits passage of some pieces of debris directly into trough 144 that would otherwise accumulate on screen 18. In other respects, the device 10' operates the same as described for device 10 and like parts are given like numbers.

The number of stroke operations of rake 20 per any given time period can be varied by well known adjustments procedures in the operation of motor 70 and gearing associated therewith to accommodate any required flow volumes and device 10 as described in actual use at one revolution per minute of the rake is easily and efficiently handling water flows of ten million gallons per day. Accordingly, in view of the foregoing, it is thought a full understanding of the construction and operation of this invention will be had and the advantages of the same will be appreciated.

I claim:

1. In a screening apparatus adapted to be disposed in a refuse laden waterstream to collect debris therein and a rake disposed for reciprocal movement relative thereto to remove collected debris, the combination therewith of:

an elongated frame defining respective upper and lower end portions, said screening apparatus mounted on said lower end portion, respective lower and upper parallel tracks extending longitudinally of said frame at said lower end portion, said rake adapted to slidably ride on said lower track in engagement with said screening apparatus in an upwardly cleaning stroke and to slidably ride on said upper track out of engagement with said screening apparatus on a downwardly return stroke, a power driven endless chan operably mounted on said frame at said upper end portion to move in respective directions towards and away from said screening apparatus, an elongated rod pivotally connected at one end to said chain for movement therewith in its path of travel and secured at its other end to said rake, fulcrum means on said frame in said upper end portion in the line of travel of said rod, movement of said chain away from said screening apparatus acting through said rod to slide said rake on said lower track in its cleaning stroke, and movement of said chain in reversing its direction towards said screening apparatus effecting the engagement of said rod with said fulcrum means and the resulting upwardly tilting of said rod and said rake to a position where further movement of said chain towards said screening apparatus acts to move said rake on said upper track on its return stroke.

2. A screening apparatus as defined in claim 1 including said upper track having a lower end terminating at a point whereby said rake in reaching said point on its return stroke drops by gravity from said upper track onto said lower track into position for a cleaning stroke.

3. A screening apparatus as defined in claim 2 including:
   a stop member on said frame in said lower end portion in line with said lower end of said upper track, and
   said rake sliding against said stop member when dropping from said upper track onto said lower track.

4. A screening apparatus as defined in claim 1 including said upper track having an upper end inclined towards said lower track to receive the tilted rake at the end of the cleaning stroke and facilitate it movement onto said upper track for the return stroke.

5. A screening apparatus as defined in claim 1 including:
   said upper track having a lower end and an upper end,
   said lower end terminating at a point whereby said rake in reaching said point on its return stroke drops by gravity from said upper track onto said lower track into position for a cleaning stroke, and
   said upper end inclined towards said lower track to receive the titled rake at the end of the cleaning stroke and facilitate its movement onto said upper track for the return stroke.

6. A screening apparatus as defined in claim 1 wherein said fulcrum means includes a wheel operably mounted to said frame in said upper end portion on a plane intermediate the respective planes of said upper and lower tracks.

7. A screening apparatus as defined in claims 1, 2, 3 or 4 including:
   first and second vertically disposed spaced sprocket wheels for moving said chain operably mounted to said frame at said upper end portion and at the furthest end of travel of said chain away from said screening apparatus,
   said chain arranged so that in moving away from said screening apparatus it first engages said first sprocket wheel and then engages said second sprocket wheel for return movement towards said screening apparatus,
   said fulcrum means disposed intermediate said sprocket wheels and said screening apparatus,
   said first sprocket wheel disposed at a point where the engagement therewith by said chain moving away from said screening apparatus is on a plane higher than the plane of said fulcrum means, and
   said second sprocket wheel disposed at a point where the engagement therewith by said chain for return movement towards said screening apparatus is on a plane lower than the plane of said fulcrum means whereby as said chain with said rod attached thereto moves around said first and second sprocket wheels said rod is slidably engaged against said fulcrum means for tilting said rod to elevate said rake and effect the positioning of said rake onto said upper track for the return stroke in the continued movement of said chain towards said screening apparatus.

8. A screening apparatus as defined in claim 7 including:
   an idler wheel operably mounted on said frame intermediate said second sprocket wheel and said fulcrum means,
   said idler wheel disposed on a plane intermediate the respective planes of said first and second sprocket wheels and higher than the plane of said fulcrum means, and
   said endless chain adapted to engage said idler wheel when moving towards said screening apparatus.

9. A screening apparatus as defined in claims 1, 2, 3, 4 or 7 wherein said apparatus comprises a plurality of elongated spaced parallel grate bars disposed longitudinall of said frame.

10. A screening apparatus as defined in claim 9 including:
   a platform hingedly secured at one edge to said frame at said upper end portion,
   a motor means on said platform,
   chain drive means operably connected between said motor means and said endless chain, and
   means adjustably securing another edge of said platform to said frame whereby the plane of said platform can be changed to selectively increase and decrease slack in said chain drive means.

11. A cleaning apparatus as defined in claims 1, 2, 3, 4 or 7 where said apparatus comprises:
   two sections each comprising a plurality of closely spaced parallel grate bars, and
   said sections separated by a passageway substantially greater than the spacing between said grate bars.

* * * * *